United States Patent [19]

Bikson et al.

[11] Patent Number: 5,071,448

[45] Date of Patent: Dec. 10, 1991

[54] SEMIPERMEABLE MEMBRANES BASED ON CERTAIN SULFONATED SUBSTITUTED POLYSULFONE POLYMERS

[75] Inventors: Benjamin Bikson, Brookline; Joyce K. Nelson, Lexington; Gertrud Götz, Brookline, all of Mass.; Yurdagul Ozcayir, Nashua, N.H.

[73] Assignee: Union Carbide Industrial Gases Technology Corporation, Danbury, Conn.

[21] Appl. No.: 622,650

[22] Filed: Dec. 5, 1990

[51] Int. Cl.$^5$ .................... B01D 61/00; B01D 71/68
[52] U.S. Cl. ............................... 55/16; 55/158; 210/654; 210/500.41
[58] Field of Search .................. 55/16, 158; 210/634, 210/640, 644, 649–654, 500.41

[56] References Cited

U.S. PATENT DOCUMENTS

| | | |
|---|---|---|
| 4,732,593 | 3/1988 | Kondo et al. . |
| 4,758,272 | 7/1988 | Pierotti et al. . |
| 4,760,047 | 7/1988 | Jeschke et al. . |
| 4,889,630 | 12/1989 | Reinhardt et al. . |

FOREIGN PATENT DOCUMENTS 61-287451 12/1986 Japan .
62-225221 10/1987 Japan .

*Primary Examiner*—Frank Sever
*Attorney, Agent, or Firm*—Alvin H. Fritschler

[57] ABSTRACT

Semipermeable membranes comprised of certain sulfonated substituted polysulfone polymers containing the polymer repeat unit (A) or (B) as herein defined. The invention also pertains to processes for using said membranes for the selective permeation of at least one gaseous component from a mixture of gases containing said gaseous component in admixture with other gaseous components.

39 Claims, No Drawings

SEMIPERMEABLE MEMBRANES BASED ON CERTAIN SULFONATED SUBSTITUTED POLYSULFONE POLYMERS

FIELD OF THE INVENTION

This invention relates to semi-permeable membranes of certain sulfonated polysulfone polymers and to processes for using said membranes for the selective permeation of at least one fluid component from a fluid mixture containing said component in admixture with other fluid components.

DESCRIPTION OF THE PRIOR ART

Sulfonated permeable membranes capable of selectively permeating one component of a fluid mixture, either liquid or gas, from a mixture thereof with other components, are considered in the art as a convenient, potentially highly advantageous means for achieving gas separations. For Practical commercial operations, such membranes must be capable of achieving an acceptable level of selectivity, or separation, of the desired component contained in the fluids feed stream while, at the same time, achieving a desirably high productivity, or Permeability rate, of component separation.

Various types of permeable, or semi-permeable, membranes are known in the art for carrying out a variety of fluid separations. Such membranes have been classified as being of the isotropic, composite, or asymmetric types, their structures being well known to those skilled in the art.

As the advantages of permeable and semi-permeable membranes have become increasingly appreciated, the performance requirements have likewise increased and the drive to find new and improved membranes for more applications has continued to grow. These demands have resulted in the art moving in the direction of very thin membranes having desired permeability characteristics without sacrifice of the separation, or selectivity, characteristics of the membrane, or of the permeation rate, or productivity, achievable.

Technology and physical factors limit how thin one can prepare the membrane film or coating, therefore, it will be advantageous to develop new membrane structures which have higher permeation rates without greatly sacrificing the ability to selectively separate the desired gas mixtures. However, the large body of gas permeability coefficients and gas separation data in the literature (e.g., Polymer Handbook, 2nd. ed. John Wiley & Sons, 1975) generally shows that increasing the permeability of fast gases, such as oxygen, hydrogen, etc., by varying the membrane's polymer structure, decreases the polymer's ability to separate fast gas from slow gas, such as oxygen from nitrogen or hydrogen from methane. The data also shows that with the current state-of-the-art it is not really possible to predict gas permeation rates or selectivity of the material even when rather minor changes are made in the chemical structure of the membrane of one polymer class, for example, such as the bisphenol-type polymer membranes, where certain structural features remain The inference drawn from this is that the inclusion of a large number of arbitrary modifications to the basic Polymer structure of one or more polymer classes in many membrane patents is not fully instructive in Predicting the usefulness of the alternative structures that had not been studied. It would appear that careful consideration needs to be given to defining the structures suitable for use in gas separation processes.

A publication in 1975 by Pilato et al. (Amer. Chem. Soc. Div. Polym. Chem., Polym, Prepr., 16(2) (1975) 41-46) showed that it is Possible to modify rigid aromatic polymer structures such as Polysulfones, polycarbonates and polyesters, including certain bisphenolphthalate polyesters not within the scope of this invention, to increase the gas permeation rate without significant decreases in helium/methane and carbon dioxide/methane separations. Though bisphenol-type Polymer membranes are disclosed, the authors make no reference to any sulfonated Polymers nor of the effect sulfonation would exert on the separation characteristics of the membranes. Based on this work and the other Publications, infra, it appears that additional effort is necessary to achieve higher gas Permeability and still retain high gas selectivity.

In U.S. Pat. No. 3,709,841, issued Jan. 9, 1973 to Quentin et al., the sulfonation of polyaryl ether sulfones with sulfur trioxide and chlorosulfonic acid is shown, including the use of the sulfonated polymers as separation membranes for electrodialysis and reverse osmosis separation processes. The reference contains no suggestion or disclosure of composite membranes suitable for separation of gaseous mixtures.

The membranes disclosed in U.S. Pat. No. 4,207,182, issued June 10, 1980 to Marze, comprise mixtures of non-sulfonated Polysulfones and sulfonated Polysulfones that can be deposited on a support. The membranes are disclosed as suitable in ultra-filtration applications but the reference contains no mention of their application in gas separation processes.

The sulfonated polyaryl ether sulphones and membranes disclosed in U.S. Pat. No. 4,054,707, issued on Oct. 18, 1977 to Quentin, are modified to the extent they can optionally contain an additional arylalkylidene unit attached to the bisphenol-A unit present in the polymer chain. These membranes are said to be of use in reverse osmosis and ultrafiltration processes for a variety of solutions or suspensions.

British Patent Specification 1,350,342, and British Patent Specification 1,350,343, both Published Apr. 18, 1974, J. Bourganel inventor disclose asymmetric (anisotropic) membranes of sulfonated polyaryl ether sulfones as useful for the fractionation of the different constituents of a solution by direct or reverse osmosis or by ultra-filtration.

In European Patent Application 237,251, published Sept. 16, 1987, B. N. Hendy inventor, sulfonated arylene polymers are disclosed, including the metal salts thereof. These polymers were used for reverse osmosis and ultrafiltration processes when supported on a porous support at a thickness of one micrometer or less, preferably in the range of 10 to 1000 nm thick, to form a composite membrane.

The use of sulfonated polysulfone membranes for reverse osmosis separations was described by A. F. Graef, et al. in a report entitled "Research On Advanced Membranes For Reverse Osmosis". This work was performed under a contract with the U. S. Department of Interior and is identified as PB 230,690. The effort was directed to the development of membranes for the single pass desalting of water and discloses the use of relatively thick cast dense films, about 0.25 mil and above and asymmetric membranes about 3.5 to 10 mils thick.

A Noshay and L. M. Robeson have studied gas permeation characteristics of sulfonated bis-A polysulfone with helium, hydrogen, carbon dioxide, nitrogen and methane, as reported in the Journal of Applied Polymer Science, Vol. 20, 1885-1903 (1976). A substantial increase in gas separation characteristics for such pairs as $He/CH_4$, $CO_2/CH_4$ and $O_2/N_2$ was found for the sulfonated bis-A polysulfone vs. the parent polysulfone. However, the increase in separation factor was accompanied by a dramatic decrease in permeation rates for all gases. In some instances, gas permeation rates decreased more than ten-fold, making the use of the specific sulfonated polysulfone unattractive for separation of the gases reported in the study.

C. C. Chiao in U.S. 4,717,395 discloses gas separations with membranes based on sulfonated polyether polysulfones. Specifically, separation of gases comprising oxygen, nitrogen or carbon dioxide from mixtures of gases containing these materials as a component thereof were disclosed. The sulfonated polyether polysulfones evaluated exhibited high separation factors but low permeation rates for oxygen and carbon dioxide gases, thus making this particular sulfonated material economically unattractive. The sulfonated polyether polysulfones reported by C. C. Chiao are not in the scope of the present invention.

In addition, some of the coinventors of the instant invention recently filed a patent application claiming sulfonated hexafluoro bisphenol A polysulfone membranes that displayed an improved combination of gas separation and permeation characteristics when used in the separation of a fluid component from a mixture of said component with other components.

Additional disclosures on the preparation of sulfonated polysulfones are U.S. Pat. Nos. 3,855,122; 3,875,096; 4,026,977; 4,207,182; 4,268,650; 4,273,903; 4,414,368; 4,508,852 and 4,717,395.

The above is representative of the extensive literature pertaining to a wide variety of sulfonated polysulfone polymer membranes and should not be construed as a full disclosure thereof but merely as a guide.

SUMMARY OF THE INVENTION

This invention pertains to certain sulfonated polysulfone membranes for the selective permeation of at least one fluid component from a mixture of fluids containing said fluid component in admixture with other fluid components wherein the separation of the components is essentially effected by a semipermeable membrane comprised of said hereinafter defined sulfonated polysulfone.

DETAILED DESCRIPTION OF THE INVENTION

This invention provides certain novel sulfonated substituted polysulfone semipermeable membranes and processes for using such composite membranes for recovering a permeate component and a non-permeate component from a fluid feed mixture.

The sulfonated substituted polysulfones of this invention can be polymers that contain the following repeat unit (A):

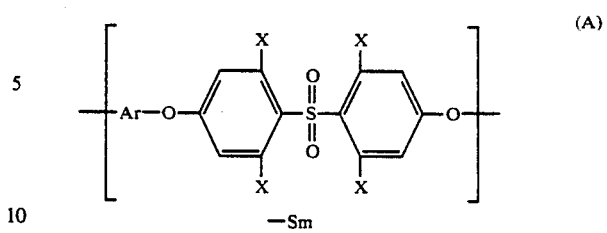

wherein Ar is an aromatic radical that can be

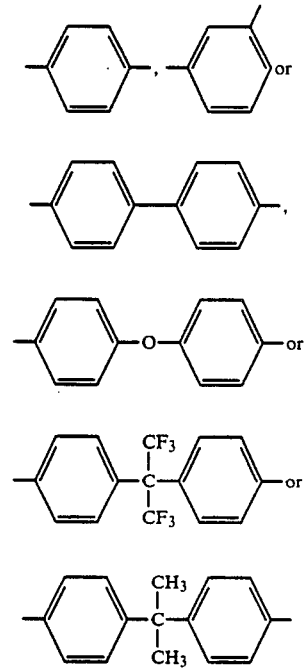

X is hydrogen or a substituent group ortho to the sulfone group and at least one X per polymer repeat unit must be (i) an alkyl substituent such as methyl, (ii) an aromatic substituent such as benzyl, (iii) alkylthio group such as —$SCH_3$ or arylthio group, (iv) a halogen atom such as bromine or iodine, or (v) a group of the formula —Si R'R"R'" wherein R', R" and R'" are alkyl or aryl; the X groups in the repeat unit need not all be the same. —$S_m$ is the sulfonic acid group (-$SO_3H$) or a salt thereof and m represents the degree of substitution (DS) of the polymer with sulfonic acid groups, which substitution generally occurs on the phenylenes distal to the sulfone group but which is not necessarily limited thereto. The sulfonated substituted polysulfones of this invention can be polymers that contain repeat units of formula (B):

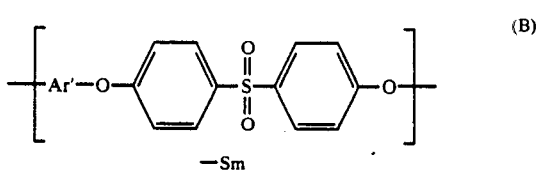

wherein Ar' is a substituted aromatic radical

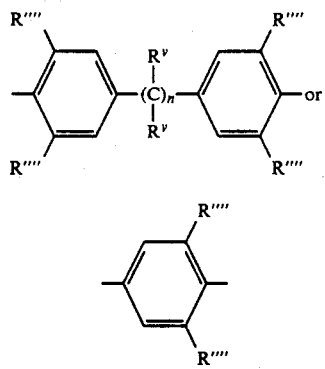

wherein R"" is hydrogen or a substituent group ortho to the ether oxygen (—O—) link and at least one R"" per polymer repeat unit must be (i) an alkyl substituent preferably methyl, or (ii) a halogen atom preferably bromine; R$^v$ is a lower alkyl group such as methyl or a halogenated lower alkyl group such as —CF$_3$, and n is zero or one; the R"" groups need not all be the same. S and m have the same meanings defined previously.

It was found that, in general the sulfonated substituted polysulfones defined in the previous paragraph exhibited an unexpected and unpredictable improvement in the combination of gas separation and permeation values.

The polysulfone used for the modification of the defined polymers, can be prepared according to the methods given by R. N. Johnson et al. (J. Polymer Science, A-1, V.5, 2375 (1967)). the methods followed for the modifications of the Polysulfone can be the lithiation-substitution of the aromatic rings according to M. D. Guiver and J. W. Apsimon (J. Polymer Science, part C, V.26, 123 (1988)) and can be the halogenation according to M. D. Guiver et al. (Polymer, V.30, 1137 (1989)).

The modified polysulfones have been sulfonated by a variety of methods, which include chlorosulfonic acid, sulfur trioxide, and sulfur trioxide/triethylphosphate complexes, according to the methods that can be found in "Sulfonation and Related Reactions", by E. E. Gilbert, R. E. Krieger Publishing Co., Huntington, N.Y. (1977), and "Mechanistic Aspects of Aromatic Sulfonation and Desulfonation", by H. Cerfontain, Interscience Publishers, N.Y. (1968).

Typically, the sulfonation reactions with chlorosulfonic acid have been carried out at low temperatures to decrease the extent of degradation. A milder sulfonation process utilizing a complex of sulfur trioxide and triethylphosphate has also been used.

The average molecular weight of the defined sulfonated substituted Polysulfone molecule is generally above about 10,000, preferably from about 25,000 to about 80,000. The polymer can be a homopolymer consisting essentially entirely of one of the defined polymer repeat units or copolymers of more than one of such units or with other units, wherein at least 50 mole percent of the copolymer molecule is represented by the polymer repeat unit (A), or (B).

An important feature of the sulfonated substituted polysulfones is the presence of the defined substitution on the aromatic rings and the Presence of sulfonic acid group on one or more of the aromatic rings of the polymer repeat unit, said sulfonic acid substitution being sufficient to impart a degree of substitution (DS) of from about 0.2 to about 2. The DS of the sulfonated substituted polysulfone is a measure of the average number of sulfonic acid groups per polymer repeat units present in the molecule.

The fluid separation membrane comprised of sulfonated polysulfones used in the processes of this invention can be in the form of a dense film or any form known to those skilled in the art. Further, it can be a composite membrane, an asymmetric membrane, or a homogeneous or isotropic membrane. The membranes may be in spiral form, flat sheet, or other configurations, as well as in hollow fiber or tubular form. Those skilled in the art are aware of the many methods available for their production and know how to prepare the membranes in any of these forms.

The isotropic and asymmetric type membranes used in the process of this invention are generally comprised essentially of a single permeable membrane material, the sulfonated substituted polysulfone polymer containing the polymer repeat unit of structure (A) or (B), which is capable of selectively separating at least one component from a fluid mixture containing said at least one component in admixture with other components. Asymmetric membranes used in the Process of this invention are distinguished by the existence of two or more morphological regions within the membrane structure; one such region comprising a thin relatively dense semipermeable skin capable of selectively permeating at least one component from a fluid mixture containing said at least one component in admixture with other components, and the other region comprising a less dense, Porous, essentially non-selective support region that serves to preclude the collapse of the thin skin region of the membrane during use. Composite membranes generally comprise a thin layer or coating of the sulfonated substituted polysulfone polymer containing the polymer repeat unit of structure (A) or (B) superimposed on a porous substrate.

The sulfonated substituted polysulfones containing the repeat unit (A) or (B) of this invention can be used as a pure membrane-forming material, an admixture of several sulfonated substituted polysulfones, or in a mixture with other organic or inorganic materials. The sulfonated substituted polysulfone will typically represent more than 50 percent by weight of the composition of the membrane material and Preferably more than 70 percent by weight of the composition of the membrane material. Some typical examples of inorganic materials that can be used in a mixture with sulfonated substituted polysulfones are inorganic acids, such as sulphuric or phosphoric acid. Organic materials useful as admixtures with the sulfonated substituted polysulfones can be high molecular weight polymers that can be neutral or can contain ionic groups, e.g., polyethylene glycol, polypropylene glycol, etc., or low molecular weight materials and plasticizers, for example, organic salts, polyhydric alcohols such as glycerine, low molecular weight amines such as ethylenediamine, acridine, piperazine, pyridine, etc.

Flat sheet membranes are readily prepared from solutions of the sulfonated substituted polysulfone Polymer containing the Polymer repeat unit of structure (A) or (B) in a suitable solvent, e.g. methoxyethanol, dimethylformamide, and the like, by casting the solution and evaporating the solvent, and thereafter drying and curing the cast film, either under vacuum, at elevated temperature, or a combination of both. Such thin film membranes can vary in thickness from about 0.5 mil to about 10 mils or more, preferably-from about 1 mil to about 3 mils.

Flat sheet membranes generally are not, however, the Preferred commercial form for gas separation applications or reverse osmosis. In large scale commercial applications hollow fiber permeable membranes are generally more desirable because they provide a significantly larger surface area per unit volume when fabricated as modules. The composite hollow fiber membranes that comprise a Porous hollow fiber support having a permeable membrane layer on the surface thereof are advantageously used for fluid separations. The methods for their Production are well known (See for example, "Hollow Fibers Manufacture and applications", ed. J. Scott, Noyes Data Corporation, N.J., 1981, p. 264 et seq.)

The sulfonated substituted polysulfone separation membranes used in the processes of this invention exhibit high gas separation or selectivity characteristics for hydrogen from methane, carbon dioxide from methane, oxygen from nitrogen, hydrogen from carbon monoxide, hydrogen sulfide from methane, and ammonia from mixtures thereof with other gases, coupled with good fast gas Permeation rates. The ability of these membranes to separate these components with such high combination of separation and permeation characteristics was completely unpredictable and unexpected and is superior to the results often exhibited by sulfonated polysulfones in the prior art. Thus, it was found that some of the sulfonated substituted polysulfones of this invention could have hydrogen or helium permeation rates up to about ten times higher than the Permeation rates of known sulfonated polysulfone materials while still exhibiting high separation factors typical of sulfonated Polysulfones.

It was observed that the sulfonated substituted polysulfone having the trimethylsilyl group as the "substituent" group generally showed higher permeability than the sulfonated polysulfones that did not contain the trimethylsilyl group in the molecule, and substantially higher gas separation factors than the unsulfonated trimethylsilyl substituted polysulfones.

Another observation was that as the degree of substitution (DS) with sulfonic groups increased, generally the permeation rate decreased and separation factor increased, thus providing a tool to adjust the composition to meet the specific needs of a particular gas separation process.

Fluid mixtures that are separated by membranes of this invention can be liquid or gaseous, mixtures. Typical gas mixtures are air, gas mixtures comprising hydrogen/nitrogen, hydrogen/methane, oxygen/nitrogen, ammonia/nitrogen, carbon dioxide/natural gas, carbon dioxide/methane, hydrogen sulfide/methane, etc. Typical liquid mixtures are aqueous salt solutions, aqueous dye solutions, suspensions of oil in water, sugar solutions, etc.

Unless otherwise indicated permeability and selectivity of the polymers were determined using flat sheet membranes. These films were prepared by casting solutions of the polymer on a glass plate followed by air-drying. The air-dried films were stripped from the glass plates and dried in a vacuum oven at 70° C. for one week. The dried films that were 1 to 3 mils thick were sandwiched between two aluminum foils exposing a 2.54 cm diameter area, placed in a permeation cell and sealed with epoxy resin. The downstream side of the cell was evacuated up to about $2 \times 10^{-2}$ mm Hg and the permeate feed gas was introduced from the upstream side. The pressure of the permeate gas on the downstream side was measured using an MKS-Barathon pressure transducer. The permeability coefficient P was calculated from the steady-state gas permeation rate according to the equation:

$$P = C \times V \times L \times \frac{\frac{dp}{dt}}{h}$$

$C$ = constant $V$ = volume of collection receiver $L$ = thickness of membrane $h$ = upstream pressure $\frac{dp}{dt}$ = slope of steady-state line To determine the intrinsic viscosity the reduced and inherent viscosities were measured at three different concentrations (0.40, 0.27 and 0.20 g/dl) The measurements were carried out in Ubbelohde type viscometers at 25° C. The intrinsic viscosity of sulfonated samples was measured in 0.5 N NaClO$_4$/dimethylformamide solvent mixture, while the intrinsic viscosity of unsulfonated polymers was measured in dimethylformamide or tetrahydrofuran.

The permeability coefficient P is reported in Barrer units, in which a Barrer is:

$P = \text{Barrer} = 10^{-10} \times \text{cm}^3(\text{STP})\text{cm/cm}^2.\text{sec.cm Hg}$ Glossary of Terms

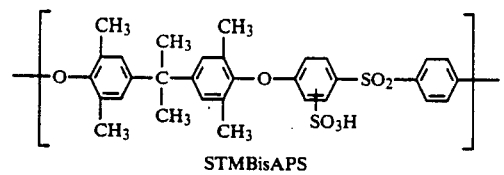
STMBisAPS

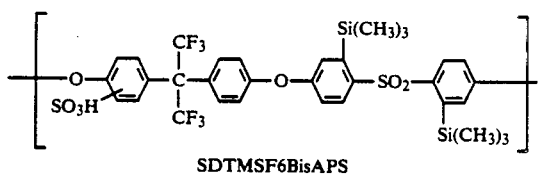
SDTMSF6BisAPS

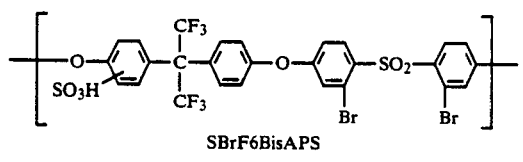
SBrF6BisAPS

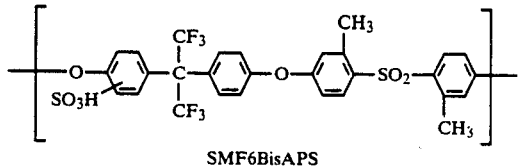
SMF6BisAPS

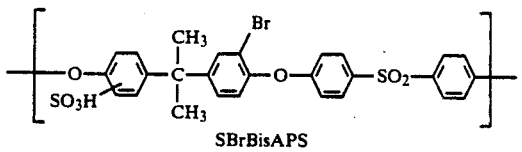
SBrBisAPS

-continued
Glossary of Terms

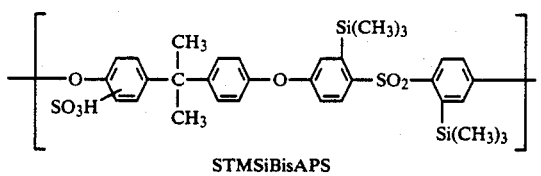

STMSiBisAPS

It is to be noted that the DS can be as previously defined, thus, although only a single sulfonic acid group is shown, in some instances the polymer repeat unit can contain, on average, less than one or more than one sulfonic group. Further, sulfonation and/or other substitution can be present at locations other than those shown above, which are shown for illustrative purposes in order to facilitate understanding.

The following examples serve to further illustrate the invention.

EXAMPLE 1

Part A

Preparation of Di-Trimethylsilylated Hexafluorobisphenol A Polysulfone (DTMSiF6BisAPS)

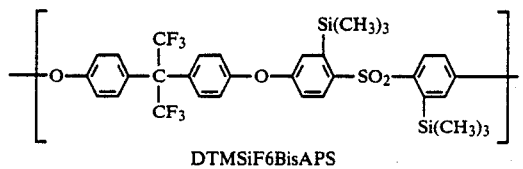

DTMSiF6BisAPS 40 grams (0.073 moles) of dry hexafluorobisphenol A polysulfone were dissolved in one liter of dry freshly distilled tetrahydrofuran at room temperature under nitrogen atmosphere. The solution was cooled to −65° C. in a methanol-dry ice bath and 93.8 ml (0.145 moles) of n-butyllithium (from 1.55 M solution in hexane) was added dropwise from an addition funnel with stirring. The yellow solution was then stirred at −35 to −40° for two and half hours. To this solution, 18.4 ml (0.145 moles) freshly distilled chlorotrimethylsilane was added at −40° C. within twenty five minutes with stirring. After one and half hours stirring at −40° C., the clear solution was cooled to −65° C. and was precipitated in methanol. The recovered polymer was dried in a vacuum oven at 60° C.

Intrinsic viscosity was 0.42 dl/g. Degree of substitution (DS) of trimethylsilyl groups was determined by elemental analysis to be 2.

Part B

Sulfonation of DTMSiF6BisAPS to produce SDTMSiF6BisAPS 3.0 grams (0.0048 moles) of di-trimethylsilylated-bis A polysulfone were dissolved in 60 ml of methylene chloride and placed in an addition funnel. The sulfur trioxide/triethylphosphate complex was prepared separately by adding 4.1 ml (4.4 grams, 0.024 moles) of triethylphosphate and 3.1 ml (5.8 grams, 0.072 moles) of sulfur trioxide to 53 ml of methylene chloride at 0° C. over a period of 25 minutes under nitrogen atmosphere. The solution was stirred at 0° C. for an additional 30 minutes and was allowed to come to room temperature before transferring it to an addition funnel.

The sulfonation was carried out by simultaneous addition of the polymer solution and the sulfur trioxide/triethylphosphate complex solution over a period of 60 minutes to 50 ml methylene chloride kept at 0° C., under nitrogen atmosphere. After the addition was complete, the reaction mixture was stirred at 0 to 5° C. for an additional 4 hours. The polymer was filtered and washed with methylene chloride twice. 200 ml of methyl alcohol was added to the precipitate. The polymer dissolved very quickly. The polymer solution was filtered. To convert the polymer to the salt form, 2.3 grams lithium chloride were added to this solution. The solution was stirred for a day and the basic solution was rotary evaporated at 40° C. to remove the residual methylene chloride. The solution was dialyzed (6-8000 MWCO) and the polymer was recovered by rotary evaporation and dried in a vacuum oven at 50° C.

Intrinsic viscosity of the SDTMSiF6BisAPS was 0.79 dl/g.

Part C

Permeation data at 30° C.

| PERMEATION DATA OF THE SULFONATED DITRI-METHLSILYLATEDHEXAFLUORO Bis A POLYSULFONE | | | | | |
|---|---|---|---|---|---|
| | PERMEABILITY[a] | | | SELECTIVITY | |
| POLYMER | P(He) | P(O2) | P(N2) | O2/N2 | He/N2 |
| SDTMSiF6BisAPS | 54.2 | 6.01 | 1.163 | 5.2 | 47 |

[a]in Barrer units

EXAMPLE 2

Part A

Bromination of Hexafluorobisphenol A Polysulfone (F6BisAPS) to BrF6BisAPS

Dibrominated F6BisAPS having the nominal structural unit:

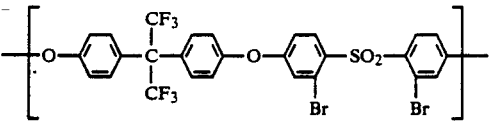

was prepared. This polymer is herein referred to as BrF6BisAPS.

10 grams (0.0182 moles) of dry F6BisAPS were dissolved in 400 ml dry, freshly distilled tetrahydrofuran at room temperature. The solution was cooled to −65° C. and 14.5 ml (0.036 mole) n-butyllithium (from 2.5 M solution in hexane were added dropwise by stirring under argon atmosphere. The temperature of the solution was raised to −30° C. and the solution was stirred for four hours at this temperature. The temperature of the solution was decreased to −65° C. and 6.4 grams bromine were added. The solution was stirred three and half hours and the temperature was increased to −30° C. and maintained at this temperature for two and half hours. The dark brown mixture was cooled to −65° C. and the polymer was precipitated into a mixture of 75/25 methanol/water. The recovered polymer was dried in a vacuum oven at 40° C. for two days. Intrinsic viscosity of the BrF6BisAPS was 0.55 dl/g.

Part B

Sulfonation or BrF6BisAPS to produce SBrF6BisAPS 5 grams (0.00775 moles) brominated-hexafluoro bis A polysulfone (BrF6BisAPS) were dissolved in 50 ml methylene chloride and 1.3 ml (2.26 grams, 0.0194 moles) chlorosulfonic acid in 11.5 ml methylene chloride was added over a period of ten minutes at −10° to −4° C. under nitrogen atmosphere with stirring. The temperature was raised to 25° C. and the reaction mixture was stirred for five hours at 25° C.

The methylene chloride was decanted and the precipitated polymer was dissolved in 100 ml of 80/20 isopropanol/water. The sample was rotary evaporated at 50° C. to remove residual methylene chloride and dialyzed (6-8000 MWCO). The recovered polymer was dried at 50° C. in a vacuum oven. Ion-exchange capacity (IEC) was 1.11 meq./g. Intrinsic viscosity of the BrF6BisAPS was 0.42 dl/g.

Part C

Permeation data at 30° C.

| PERMEATION DATA OF THE SULFONATED BROMINATEDHEXAFLUORO Bis A POLYSULFONE | | | | | | |
|---|---|---|---|---|---|---|
| | PERMEABILITY[a] | | | | SELECTIVITY | |
| POLYMER | P(He) | P($O_2$) | P($N_2$) | P($CO_2$) | $O_2/N_2$ | He/$N_2$ |
| F6BisAPS | 34.3 | 3.36 | 0.648 | 15.3 | 5.2 | 53 |
| BrF6BisAPS | 24.5 | 1.42 | 0.223 | 5.54 | 6.4 | 110 |
| SBrF6BisAPS | 13.9 | 0.48 | 0.069 | 2.08 | 7.0 | 202 |

[a] in Barrer units

EXAMPLE 3

Part A

Methylation of F6BisAPS to MF6BisAPS

Methylated F6BisAPS was prepared having the following nominal structural unit:

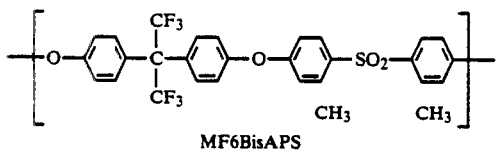

MF6BisAPS 10 grams (0.0182 moles) of dry F6BisAPS were dissolved in 250 ml dry, freshly distilled tetrahydrofuran at room temperature under argon atmosphere and the solution was cooled to 31 65° C. 2.34 grams (0.036 moles, 14 ml from 2.5 M solution in hexane) n-butyllithium was added over a period of fifteen minutes with stirring. The temperature of the solution increased to −30° C. and stirring was continued for two hours at this temperature.

2.3 ml (5.11 grams, 0.036 moles) of methyliodide were added dropwise over a period of ten minutes. The mixture was stirred for two hours at −30° C. The clear solution was cooled to −65° C and precipitated in methanol. The recovered polymer was dried in a vacuum oven at room temperature.

The intrinsic viscosity of the MF6BisAPS was 0.61 dl/g. The degree of methyl substitution was calculated as 2.1.

Part B

Sulfonation of MF6BisAPS to SMF6BisAPS

Five grams of the MF6BisAPS were dissolved in 50 ml of methylene chloride and the solution was cooled to −4° C. Over a period of 15 minutes a solution of 1.9 ml of chlorosulfonic acid in 18 ml <of methylene chloride was added at −4° C. and then the reaction mixture was allowed to come to room temperature over a Period of two hours. After stirring at room temperature for five hours the methylene chloride was decanted and the sulfonated Polymer was washed three times with methylene chloride. It was then dissolved in 50 ml of ethanol, rotary evaporated to remove residual methylene chloride and dialyzed. After dialysis the sample was rotary evaporated and vacuum dried at 50° C. The SMF6BisAPS had an IEC of 2 meq/g and an intrinsic viscosity of 0.47 dl/g.

Part C

Permeation data at 30° C.

| PERMEATION DATA OF THE SULFONATED METHYLATEDHEXAFLUORO Bis A POLYSULFONE | | | | | |
|---|---|---|---|---|---|
| | PERMEABILITY[a] | | | SELECTIVITY | |
| POLYMER | P(He) | P($O_2$) | P($N_2$) | $O_2/N_2$ | He/$N_2$ |
| F6BisAPS | 34.3 | 3.36 | 0.648 | 5.2 | 53 |
| MF6BisAPS | 21.9 | 0.89 | 1.123 | 7.2 | 178 |
| SMF6BisAPS | 14.1 | 0.39 | 0.054 | 7.2 | 261 |

[a] in Barrer units

EXAMPLE 4

Part A

Bromination of Bis A Polysulfone to BrBis APS

Brominated Bis A Polysulfone having the nominal structure unit:

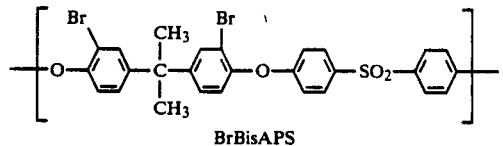

BrBisAPS was prepared. This polymer is herein referred to as BrBisAPS.

11.05 grams (0.025 moles) of Bis A Polysulfone (BisAPS) was dissolved in 60 ml chloroform. 11 grams (0.069 moles) of bromine was added from an addition funnel in five minutes. After fifteen minutes hydrogen bromide release was observed. The solution was stirred for 1.5 to 2 hours. The reaction mixture was precipitated in methanol. The polymer was filtered and left in fresh methanol overnight to leach the unreacted bromine. The BrBisAPS polymer was precipitated from chloroform solution in methanol and dried in a vacuum oven at 50° C.

The intrinsic viscosity was 0.27. The degree of bromine substitution was calculated as 1.6.

Part B

Sulfonation of Brominated Bisphenol A Polysulfones to SBrBisAPS 7 grams of BrBisAPS e dissolved in 70 ml methylene chloride at room temperature under inert gas atmosphere. The solution was cooled to $-15°$ C. and a solution of 1.5 ml of chlorosulfonic acid in methylene chloride was added from an addition funnel in ten minutes. The temperature of the solution was increased to $-4°$ C. and maintained there for four hours. The reaction was discontinued by decanting methylene chloride and dissolving the product in 100 ml 80/20 isopropanol/water. The mixture was rotary evaporated to remove the residual methylene chloride. The solution was dialyzed (6–8000 MWCO). The SBrBisAPS was recovered by rotary evaporator and dried in a vacuum oven at 50° C.

The intrinsic viscosity was 0.28 dl/g. The ion-exchange capacity (IEC) was 0.89 meq/g.

Part C

Permeation data at 30° C.

| | PERMEATION DATA OF SULFONATED BROMINATED Bis A POLYSULFONE | | | | | |
|---|---|---|---|---|---|---|
| POLY-MER | PERMEABILITY[a] | | | | SELECT-IVITY | |
| | P(He) | P(O$_2$) | P(N$_2$) | P(CO$_2$) | O$_2$/N$_2$ | He/N$_2$ |
| BisAPS | 10.3 | 1.04 | 0.174 | 5.17 | 6.0 | 59 |
| BrBisAPS | 6.58 | 0.310 | 0.034 | 1.28 | 9.1 | 194 |
| SBrBisAPS | 8.40 | 0.212 | 0.019 | — | 11 | 442 |

[a]in Barrer units

Example 5

Part A

Preparation of trimethylsilylated bisphenol A polysulfone from BisAPS

Trimethylsilylated bisphenol A polysulfone (herein TMsiBisAPS having the nominal polymer repeat unit:

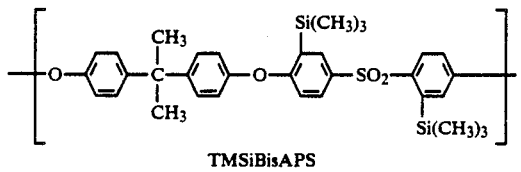

TMSiBisAPS was prepared.

10 grams (0.226 moles) of dry bisphenol A polysulfone were dissolved in 250 ml dry freshly distilled tetrahydrofuran at room temperature under argon atmosphere. The solution was cooled 31 65° C. in a methanol-dry ice bath. 2.89 grams (0.0452 moles, 28.3 ml from 1.6 M solution in hexane) n-butyllithium were added dropwise over a period of ten minutes. After two hours stirring at 31 65° C., 5.74 ml (4.91 grams, 0.0452 moles) of chlorotrimethylsilane were added and the temperature of the solution was increased to 31 20° C. and maintained at that temperature for thirty minutes.

The TMsiBisAPS polymer was precipitated in methanol and dried in a vacuum oven at 50° C.

The intrinsic viscosity was 0.44 dl/g.

Part B

Sulfonation of TMSiBisAPS to STMSiBisAPS 20 grams (0.034 moles) of TMSiBisAPS were dissolved in 200 ml methylene chloride under argon atmosphere and the solution was cooled to $-4$ to $-6°$ C. 3.8 ml (0.058 moles, 6.75 grams) of chlorosulfonic acid in 36 ml methylene chloride were added from an addition funnel dropwise over a period of thirty minutes with stirring. After three hours of stirring at $-4°$ C., the reaction was discontinued by decanting the methylene chloride and washing with fresh methylene chloride. The residue was dissolved in 200 ml of 80/20 isopropanol/water and rotary evaporated to remove the residual methylene chloride. The sample was dialyzed (6–8000 MWCO). The STMSiBisAPS polymer was recovered by rotary evaporation and dried in a vacuum oven at 50° C.

The intrinsic viscosity was 0.33 dl/g. The ion-exchange capacity (IEC) was 1.32 meg/g.

Part C

Permeation data at 30° C.

| PERMEATION DATA OF SULFONATED TRIMETHYLSILYLATED BIS A POLYSULFONE | | | | | |
|---|---|---|---|---|---|
| | PERMEABILITY[a] | | | SELECTIVITY | |
| POLYMER | P(He) | P(O$_2$) | P(N$_2$) | O$_2$/N$_2$ | He/N$_2$ |
| BisAPS | 10.3 | 1.04 | 0.174 | 6.0 | 59 |
| TMSiBisAPS | 27.4 | 3.20 | 0.55 | 5.8 | 50 |
| STMSiBisAPS | 19.0 | 1.34 | 0.20 | 6.7 | 95 |

[a]in Barrer units

EXAMPLE 6

Part A

Sulfonation of TMBisAPS having the nominal structural unit:

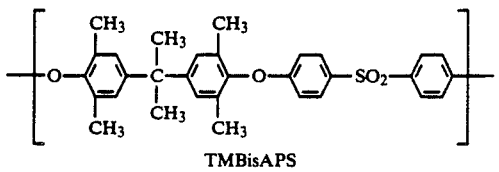

TMBisAPS to sulfonated tetramethyl bisphenol A polysulfone (STMBisAPS).

Five grams (0.010 moles) of tetramethyl bisphenol A polysulfone were dissolved in 100 ml of methylene chloride and placed in an addition funnel. The sulfur trioxide/triethylphosphate complex was prepared by adding, over a period of thirty minutes with stirring under nitrogen atmosphere, 2.55 (2.75 grams, 0.015 moles) of triethylphosphate and 1.22 ml (1.93 grams, 0.0241 moles) of sulfur trioxide to 22 ml of methylene chloride cooled to 0° C. The solution was stirred for an additional thirty minutes and was then allowed to come to room temperature before transferring it to an addition funnel.

The sulfonation was carried out by the simultaneous addition of the polymer solution and the sulfur trioxide/triethylphosphate complex solution over a period of sixty minutes at 0° C. to 100 ml methylene chloride with stirring under nitrogen atmosphere. The reaction was discontinued as soon as addition was complete. The solvent was decanted and 100 ml 80/20 methanol/water solution was added. The residual methylene chloride was removed by rotary evaporation of this mixture at 25° C. The sample was dialyzed (6-8000 MWCO) and the recovered STMBisAPS polymer was dried in a vacuum oven over phosphate pentoxide at room temperature.

The intrinsic viscosity was 0.63 dl/g. The ion-exchange capacity (IEC) was 1.17 meq/g.

Part B

Permeation data at 30° C.

| | PERMEATION DATA OF THE SULFONATED TETRAMETHYL Bis A POLYSULFONE | | | | | | | | |
|---|---|---|---|---|---|---|---|---|---|
| | PERMEABILITY[a] | | | | | | SELECTIVITY | | |
| | P(He) | P($H_2$) | P($O_2$) | P($N_2$) | P($CH_4$) | P($CO_2$) | $O_2/N_2$ | He/$N_2$ | $H_2/CH_4$ |
| TMBisAPS | 33.7 | — | 3.97 | 0.710 | — | — | 5.6 | 48 | — |
| STMBisAPS | 21.1 | 22.7 | 1.52 | 0.23 | 0.171 | 7.53 | 6.7 | 93 | 133 |

[a] in Barrer units

The results show that STMBisAPS displays a combination of high separation factors combined with good permeation rates. The gas permeation properties of STMBisAPS are substantially better than sulfonated bis A polysulfone of the prior art.

What is claimed is:

1. A fluid separation membrane capable of achieving enhanced permeability of the more permeable component of a fluid mixture while retaining the high selectivity of sulfonated polysulfones consisting essentially of a sulfonated substituted polysulfone selected from the group consisting of:

(A) a sulfonated bisphenol polysulfone containing the polymer repeat unit:

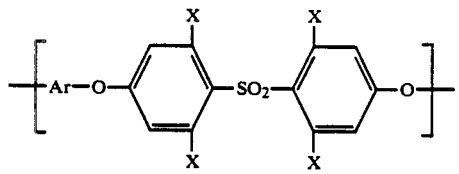

wherein Ar is an aromatic radical from the group consisting of:

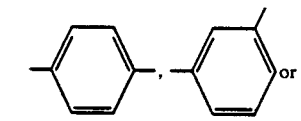

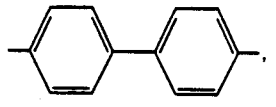

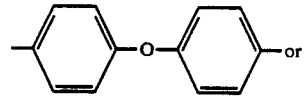

-continued

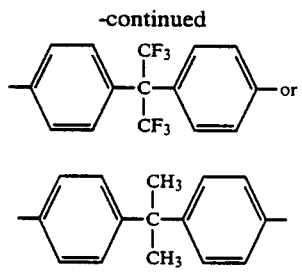

X is hydrogen or a substituent group ortho to the sulfone group and at least one X per polymer repeat unit must be (i) an alkyl substituent or (ii) an aryl substituent or (iii) an alkylthio or arylthio group or (iv) a halogen atom or (v) an —SiR'R"R'" group wherein R', R" and R'" are alkyl or aryl; or (B) a sulfonated bisphenol polysulfone containing the polymer repeat unit

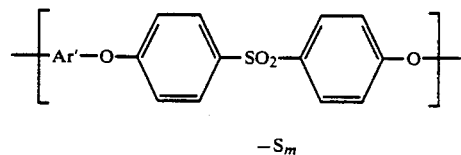

wherein Ar' is a substituted radical from the group consisting of:

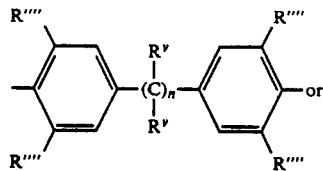

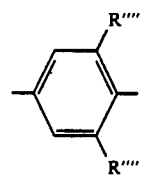

R'''' is hydrogen or a substituent group ortho to the ether oxygen link and at least one R'''' per polymer repeat unit must be (i) an alkyl substituent or (ii) a halogen atom; R$^v$ is a lower alkyl group or a halogenated lower alkyl group and n is zero or one; and wherein $S_m$ is the sulfonic acid group or a salt thereof and m represents the degree of sulfonation of the polymer, said membrane exhibiting the high selectivity of sulfonated polysulfones together with enhanced permeability characteristics, whereby such enhanced combination of permeability and selectivity provides unexpectedly superior fluid separation performance capabilities for said fluid separation membranes.

2. A fluid separation membrane as claimed in claim 1 wherein said sulfonated substituted polysulfone is

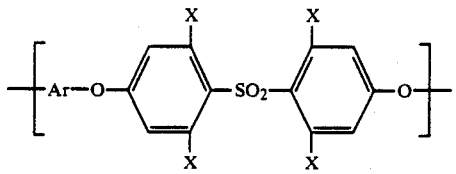

wherein Ar, X, —$S_m$ and m as defined in claim 1.

3. A fluid separation membrane as claimed in claim 2 wherein the degree of substitution (DS) is from about 0.2 to about 2.

4. A fluid separation membrane as claimed in claim 2 wherein Ar is

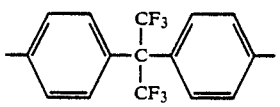

and at least one X is —Si(CH$_3$)$_3$ or halogen

5. A fluid separation membrane as claimed in claim 4 wherein at least one X is bromine.

6. A fluid separation membrane as claimed in claim 4 wherein at least one X is methyl.

7. A fluid separation membrane as claimed in claim 2 wherein A is

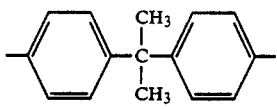

8. A fluid separation membrane as claimed in claim 1 wherein said sulfonated substituted polysulfone is a sulfonated bisphenol polysulfone containing the polymer repeat unit

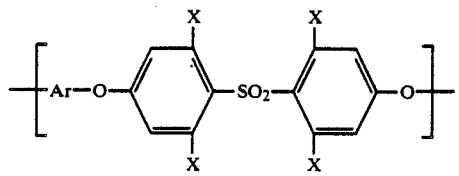

wherein Ar', R'''', R$^v$, —$S_m$ and m are as defined in claim 1.

9. A fluid separation membrane as claimed in claim 8 wherein the degree of substitution (DS) is from about 0.2 to about 2.

10. A fluid separation membrane as claimed in claim 8 wherein Ar' is

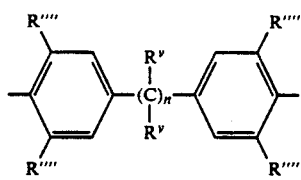

11. A fluid separation membrane as claimed in claim 10 wherein at least one R'''' is methyl or halogen.

12. A fluid separation membrane as claimed in claim 1 wherein said membrane is the form of a film.

13. A fluid separation membrane as claimed in claim 1 wherein said membrane is a composite membrane.

14. A fluid separation membrane as claimed in claim 1 wherein said membrane is in the form of hollow fibers.

15. A fluid separation membrane as claimed in claim 1 wherein said membrane is a composite hollow fiber membrane.

16. A process for separating a component from a fluid mixture which comprises contacting said fluid mixture with one side of a fluid separation membrane capable of achieving enhanced permeability of the more permeable component of a fluid mixture while retaining the high selectivity of sulfonated polysulfones consisting essentially of a sulfonated substituted polysulfone selected from the group consisting of:

(A) a sulfonated bisphenol polysulfone containing the polymer repeat unit:

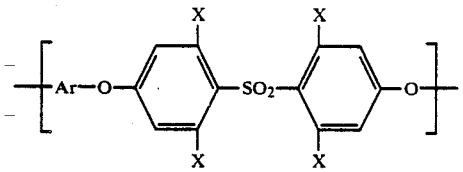

wherein Ar is an aromatic radical from the group consisting of:

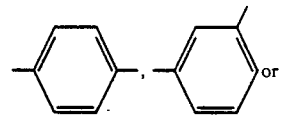

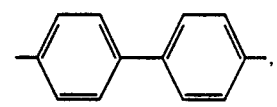

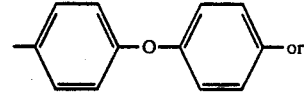

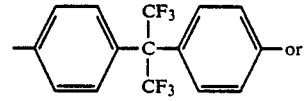

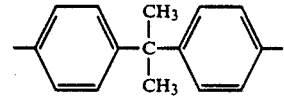

X is hydrogen or a substituent group ortho to the sulfone group and at least one X per polymer repeat unit must be (i) an alkyl substituent or (ii) an aryl substituent or (iii) an alkylthio or arylthio group or (iv) a halogen atom or (v) an —SiR'R"R''' group wherein R', R" and R''' are alkyl or aryl; or (B) a sulfonated bisphenol polysulfone containing the polymer repeat unit

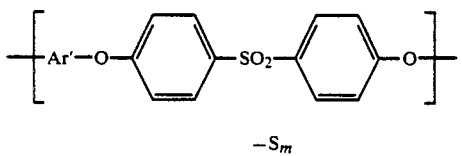

$-S_m$ wherein Ar' is a substituted radical from the group consisting of:

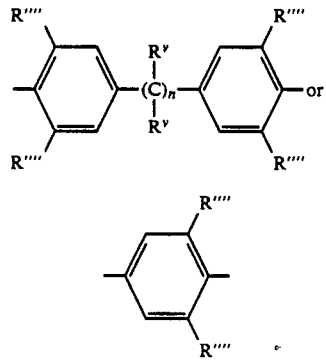

R''' is hydrogen or a substituent group ortho to the ether oxygen link and at least one R'''' per polymer repeat unit must be (i) an alkyl substituent or (ii) a halogen atom; R$^v$ is a lower alkyl group or a halogenated lower alkyl group and n is zero or one; and wherein —S$_m$ is the sulfonic acid group or a salt thereof and m represents the degree of sulfonation of the polymer, maintaining a pressure differential between the two sides of said membrane and recovering the permeate component from the other side of said membrane, said membrane exhibiting the high selectivity of sulfonated polysulfones together with enhanced permeability characteristics, whereby such enhanced combination of permeability and selectivity provides unexpectedly superior fluid separation performance capabilities for the desired separation of a component from a fluid mixture.

17. A process as claimed in claim 16 wherein at least 50 weight percent of said membrane material comprises polymers or copolymers containing said polymer repeat units (A) or (B).

18. A process as claimed in claim 16 wherein said sulfonated substituted polysulfone is

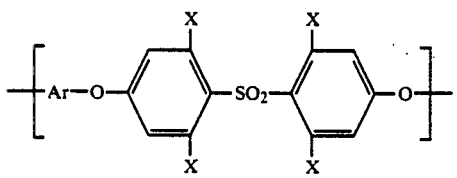

wherein Ar, X, S and m are as defined in claim 1.

19. A process as claimed in claim 18 wherein the degree of substitution (DS) is from about 0.2 to about 2.

20. A process as claimed in claim 18 wherein Ar is

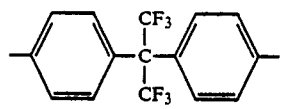

and at least one X is —Si(CH$_3$)$_3$ or halogen

21. A process as claimed in claim 20 wherein at least one X is bromine.

22. A process is claimed in claim 20 wherein at least one X is methyl.

23. A process as claimed in claim 18 wherein Ar is

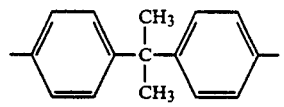

24. A process as claimed in claim 16 wherein said sulfonated substituted polysulfone is a sulfonated bisphenol polysulfone containing the polymer repeat unit

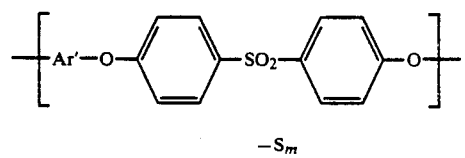

$-S_m$ wherein Ar', R'''', R$^v$, —S$_m$ and m are as define in claim 1.

25. A process as claimed in claim 24 wherein the degree of substitution (DS is from about 0.2 to about 2.

26. A process as claimed in claim 24 wherein Ar' is

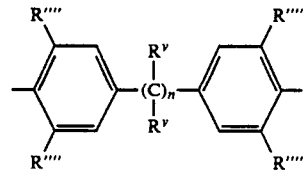

27. A process as claimed in claim 16 wherein said fluid separation membrane is a film.

28. A process as claimed in claim 16 wherein said fluid separation membrane is a composite membrane.

29. A process as claimed in claim 16 wherein said fluid separation membrane is a hollow fiber.

30. A process as claimed in claim 16 wherein said fluid separation membrane is a composite hollow fiber membrane.

31. A process as claimed in claim 16 wherein said fluid mixture is a gaseous mixture.

32. A process as claimed in claim 16 wherein said fluid mixture comprises air.

33. A process is claimed in claim 16 wherein said fluid mixture comprises hydrogen in admixture with at least one other gas.

34. A process as claimed in claim 16 wherein said fluid mixture comprises oxygen in admixture with at least one other gas.

35. A process is claimed in claim 16 wherein said fluid mixture comprises carbon dioxide in admixture with at least one other gas.

36. A process is claimed in claim 16 wherein said fluid mixture comprises water vapor in admixture with at least one other gaseous component.

37. A process as claimed in claim 16 wherein said fluid mixture comprises ammonia in admixture with at least one other gas.

38. A process as claimed in claim 16 wherein said fluid mixture comprises methane in admixture with at least one other gas.

39. A process as claimed in claim 16 wherein said fluid mixture comprises hydrogen sulfide in admixture with at least one other gas.

* * * * *